US007583040B2

(12) United States Patent
Claudel et al.

(10) Patent No.: US 7,583,040 B2
(45) Date of Patent: Sep. 1, 2009

(54) MOTORIZED CLOSURE OPERATING DEVICE WITH ELECTRONIC CONTROL SYSTEM

(75) Inventors: Christian Claudel, Richelieu (CA); ChangLu Wang, Dollard-des-Ormeaux (CA)

(73) Assignee: 9141-0720 Quebec Inc., Pointe-Claire, Quebec (CA)

( * ) Notice: Subject to any disclaimer, the term of this patent is extended or adjusted under 35 U.S.C. 154(b) by 0 days.

(21) Appl. No.: 11/536,922

(22) Filed: Sep. 29, 2006

(65) Prior Publication Data

US 2007/0075665 A1 Apr. 5, 2007

Related U.S. Application Data

(60) Provisional application No. 60/721,997, filed on Sep. 30, 2005.

(51) Int. Cl.
*G05D 3/00* (2006.01)

(52) U.S. Cl. ....................... 318/466; 318/264; 318/265; 318/266; 318/286; 318/469

(58) Field of Classification Search ................. 318/280, 318/16, 466, 286, 467, 468, 469, 264, 265, 318/266
See application file for complete search history.

(56) References Cited

U.S. PATENT DOCUMENTS

| | | | | |
|---|---|---|---|---|
| 3,752,208 | A * | 8/1973 | Roberts | 160/1 |
| 4,475,069 | A * | 10/1984 | Tadokoro et al. | 318/265 |
| 4,979,603 | A | 12/1990 | Wheatland | |
| 5,079,417 | A | 1/1992 | Strand | |
| 5,218,282 | A | 6/1993 | Duhame | |
| 5,278,480 | A | 1/1994 | Murray | |
| 6,404,158 | B1 * | 6/2002 | Boisvert et al. | 318/469 |
| 6,534,941 | B2 * | 3/2003 | Desrochers et al. | 318/466 |
| 6,548,979 | B2 * | 4/2003 | Boisvert et al. | 318/469 |
| 6,696,806 | B2 | 2/2004 | Study et al. | |
| 6,737,821 | B1 * | 5/2004 | Fitzgibbon et al. | 318/280 |
| 6,737,823 | B2 * | 5/2004 | Reed et al. | 318/466 |
| 6,822,410 | B2 * | 11/2004 | Whinnery et al. | 318/469 |
| 6,870,334 | B2 | 3/2005 | Jurado et al. | |
| 6,879,122 | B1 * | 4/2005 | Stewart et al. | 318/280 |
| 6,936,984 | B2 * | 8/2005 | Wilson | 318/280 |
| 7,038,409 | B1 * | 5/2006 | Mullet | 318/280 |
| 7,091,688 | B2 * | 8/2006 | Gioia et al. | 318/466 |
| 7,196,486 | B2 * | 3/2007 | Nakamura et al. | 318/469 |
| 7,219,575 | B2 * | 5/2007 | Flynn | 74/512 |
| 7,312,591 | B2 * | 12/2007 | Washeleski et al. | 318/280 |
| 7,342,373 | B2 * | 3/2008 | Newman et al. | 318/466 |
| 2004/0195986 | A1 * | 10/2004 | Fitzgibbon et al. | 318/280 |
| 2005/0174077 | A1 * | 8/2005 | Haag et al. | 318/280 |

* cited by examiner

*Primary Examiner*—Bentsu Ro
*Assistant Examiner*—Antony M Paul
(74) *Attorney, Agent, or Firm*—Ogilvy Renault LLP

(57) ABSTRACT

An operating device for an overhead closure which comprises a motor, operatively connected to the closure for opening and closing the closure, and at least one sensor unit mountable either the closure or a support surface bordering the closure. The sensor unit is operable to detect the presence of an obstacle obstructing a travel path of the closure and to generate a signal in response thereto. A control system is in communication with the sensor and with the motor. The control system includes a control unit which receives the signal and provides a sensing feature which stops and/or opens the closure in response to the signal. The control unit deactivates the sensing feature at a selected point prior to an end limit position of the closure. The selected point is determined by the control unit based on a calculated delay characteristic.

21 Claims, 4 Drawing Sheets

MOTORIZED CLOSURE OPERATING DEVICE WITH ELECTRONIC CONTROL SYSTEM

CROSS-REFERENCE TO RELATED APPLICATIONS

The present application claims priority on U.S. Provisional Patent Application Ser. No. 60/721,997 filed Sep. 30, 2005, the entire contents of which is incorporated herein by reference.

TECHNICAL FIELD

The present invention relates to a motorized operating device for an overhead closure, and, more particularly, to a motorized closure operating device with an electromechanical or electronic control system.

BACKGROUND OF THE ART

Overhead closures or barriers are well known and used in a variety of applications including, but not exclusively, garage doors, room dividers and the like. Most such closures are operated (i.e. opened and closed) by way of an electric motor, which is typically actuated by remote control, proximity sensors and/or by a suitable switch mounted near the closure, such as a push-button or key-pad for example.

Such closures also commonly include obstacle detection systems which prevent the closure from closing completely if an obstacle is present in its travel path. Such sensing features include a sensing edge located along the bottom edge of the closure which detects contact with such an obstacle and signals the electric motor to stop the movement of the closure and/or reverse the direction of travel thereof. Light beam based photo-switches are also used to similarly stop and reverse the closure direction in the event of an obstacle in the travel path of the closure.

However, as the closure reaches its predetermined end travel limit position (i.e. the position at which the closure is to stop in order to seal the opening closed off by the closure), such sensing features which normally reverse the direction of travel of the closure must be temporarily deactivated, so as to not undesirably re-open the closure when it is to remain closed.

Such a temporary deactivation of the sensing features is normally called the "advance close" feature of the operating device. Commonly, this is achieved mechanically using a mechanism located within the operating device which includes a two-step activation switch and a displaceable lever which acts thereon. For example, such a mechanism would operate as follows. Shortly before the closure reaches its fully closed position, the internal lever acts against a first switch to depress the actuating button thereof, thereby activating the advance close feature (i.e. temporarily deactivating the sensing features) such as to prevent the sensors from inopportunely reversing the door travel direction upon reaching the fully closed position. Once the closure reaches its "advance close" position, the lever is further displaced to depress a second switch that requires greater actuating button travel, i.e. in order to thereby fully stop all movement of the closure. Alternately, a single stop switch may be used, which has a two-tiered stop button travel. Typically, the displaceable lever is acted upon by a cam disk which translates along an endless screw within the operating device in accordance with the position of the closure.

One problem with the above-described mechanically operated advance close feature typical of most closure operating devices resides in the lack of adjustability and control that they provide. Further, they necessitate careful setup and make adjusting the full stop position of the closure, and particularly fine tuning the advance close position thereof, difficult. For instance, if the device has been configured to be installed within an opening such that the closure will travel at a given speed, but an alternate speed, and therefore location of the deactivation of the sensing features, is in fact required, careful readjustment of the relative positions of the lever and cam disk location of the mechanism within the operating device must be performed. Further, this also necessitates a relatively complex two-stage switch used to stop the electric motor driving the closure.

An improved closure operating device is therefore sought.

SUMMARY OF THE INVENTION

It is therefore an aim of the present invention to provide an improved closure operating device.

Therefore, in accordance with one aspect of the present invention, there is provided a closure operating device for opening and closing an overhead closure, the closure operating device comprising: a motor operatively connected to an output shaft for rotation thereof, said output shaft being adapted to drive said closure for displacement thereof along a travel path between open and closed limit positions; a sensing system operable to at least one of stop and open the closure upon detection of the presence of an obstacle obstructing the travel path of said closure; a control system in communication with said motor and said sensing system, said control system including a control unit operable to deactivate said sensing system at a selected point prior to said closed limit position of said closure; at least one switch in communication with said control system and actuable by a switch actuator, the switch actuator being displaceable along the output shaft and operable to actuate said switch when disposed in a predetermined position therealong; and wherein the control system determines one of said selected point for the deactivation of the sensing system and the closed limit position of the closure, based on a delay period relative to the actuation of said switch.

There is also provided, in accordance with another aspect of the present invention, an operating device for an overhead closure, the operating device comprising: a motor operatively connected to said closure for opening and closing the closure; at least one sensor unit mountable to one of the closure and a support surface bordering the closure, the sensor unit being operable to detect the presence of an obstacle obstructing a travel path of said closure and to generate a signal in response thereto; and a control system in communication with said sensor and with said motor, said control system including a control unit which receives said signal and provides a sensing feature which at least one of stops and opens the closure in response to said signal, said control unit deactivating said sensing feature at a selected point prior to an end limit position of said closure, the selected point being determined by the control unit based on a calculated delay characteristic.

In accordance with a further aspect of the present invention, there is provided a method of controlling operation of a closure using an electronic control system, the method comprising: using a sensing system to determine the presence of an obstacle obstructing a travel path of the closure and to at least one of stop and open the closure when the presence of said obstacle is detected; determining a selected position of the closure below which obstacle detection using the sensing system is not required, and using said electronic control system to calculate a delay characteristic corresponding to said selected position of said closure; and deactivating said sensing system using said control system based on said delay characteristic.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
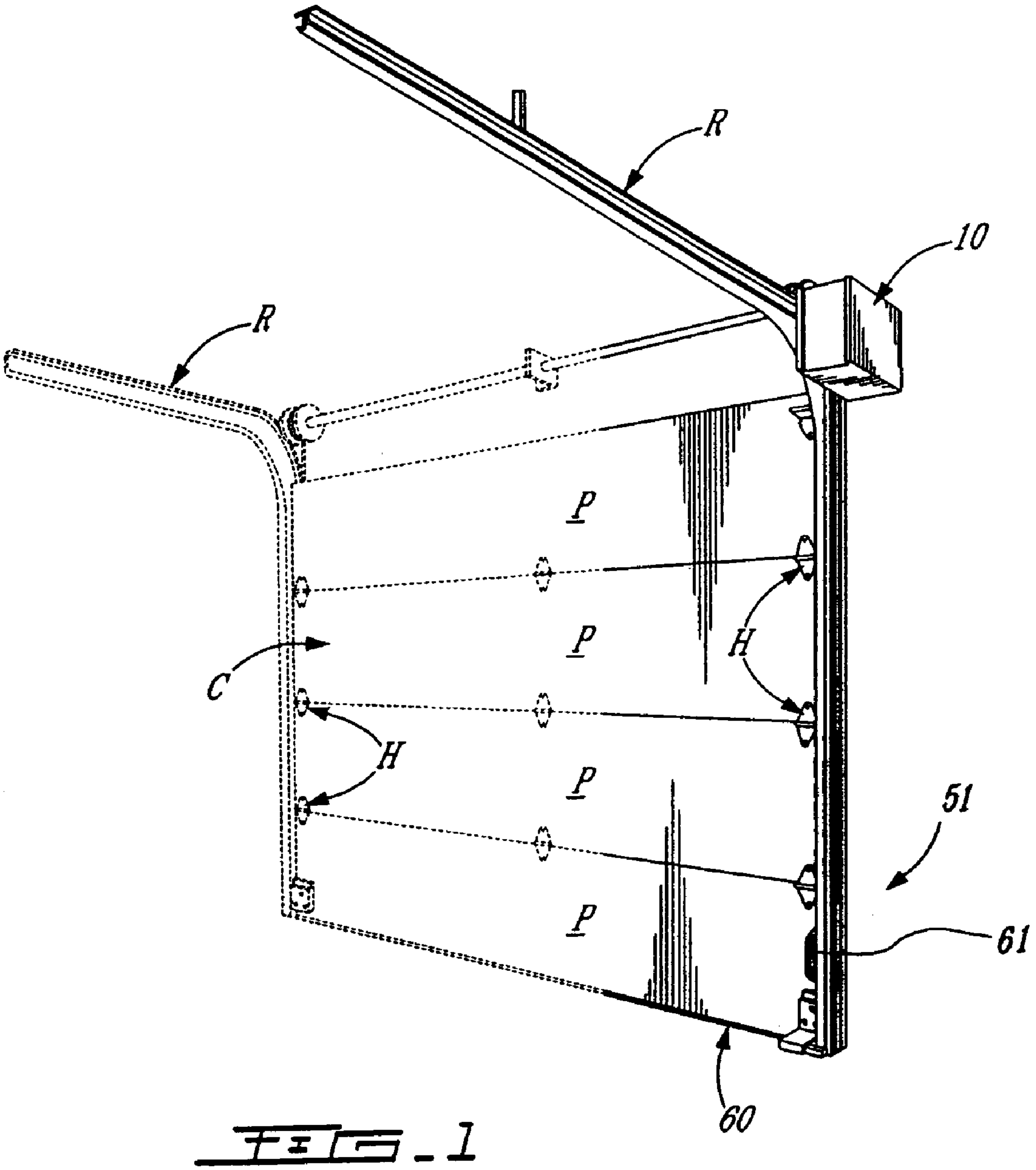
FIG. 1 is a perspective view illustrating a conventional overhead closure, such as a garage door, equipped with an operating device for opening and closing the closure.

In FIG. 1, an overhead closure C, such as a garage door, room divider, etc. includes in this case four sectional panels P hinged together by hinges H to allow relative pivots of the panels P one to the other when they are driven, manually or by way of a operating device 10, along a pair of lateral guide rails R. The operating device 10, although shown mounted at the edge of closure C, can similarly be centrally mounted relative to the closure, i.e. between each of the laterally spaced guide rails R. The operating device 10 preferably includes an electric motor, as described in further detail below, however manual operation of the closure C remains possible by decoupling the driving motor of the operating device 10 such that a user can manually open and close the closure C, such as by using chain driven pulleys, for example, with or without a speed reduction. Speed reduction can be achieved using a belt and pulley drive system, or alternately a suitable gearbox.

Figure 2:
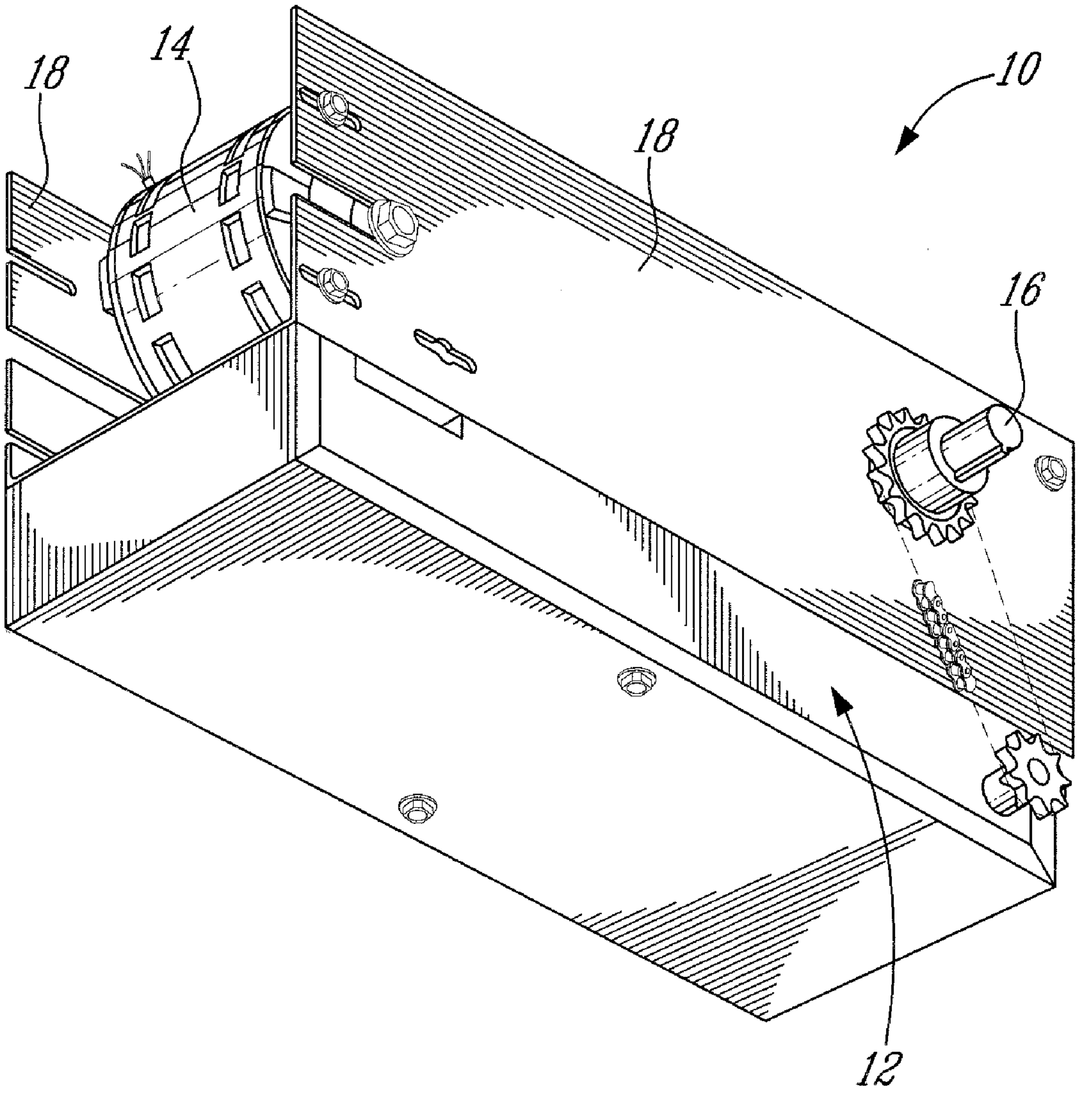
FIG. 2 is a lower perspective view of a closure operating device in accordance with the present invention.
Figure 3:
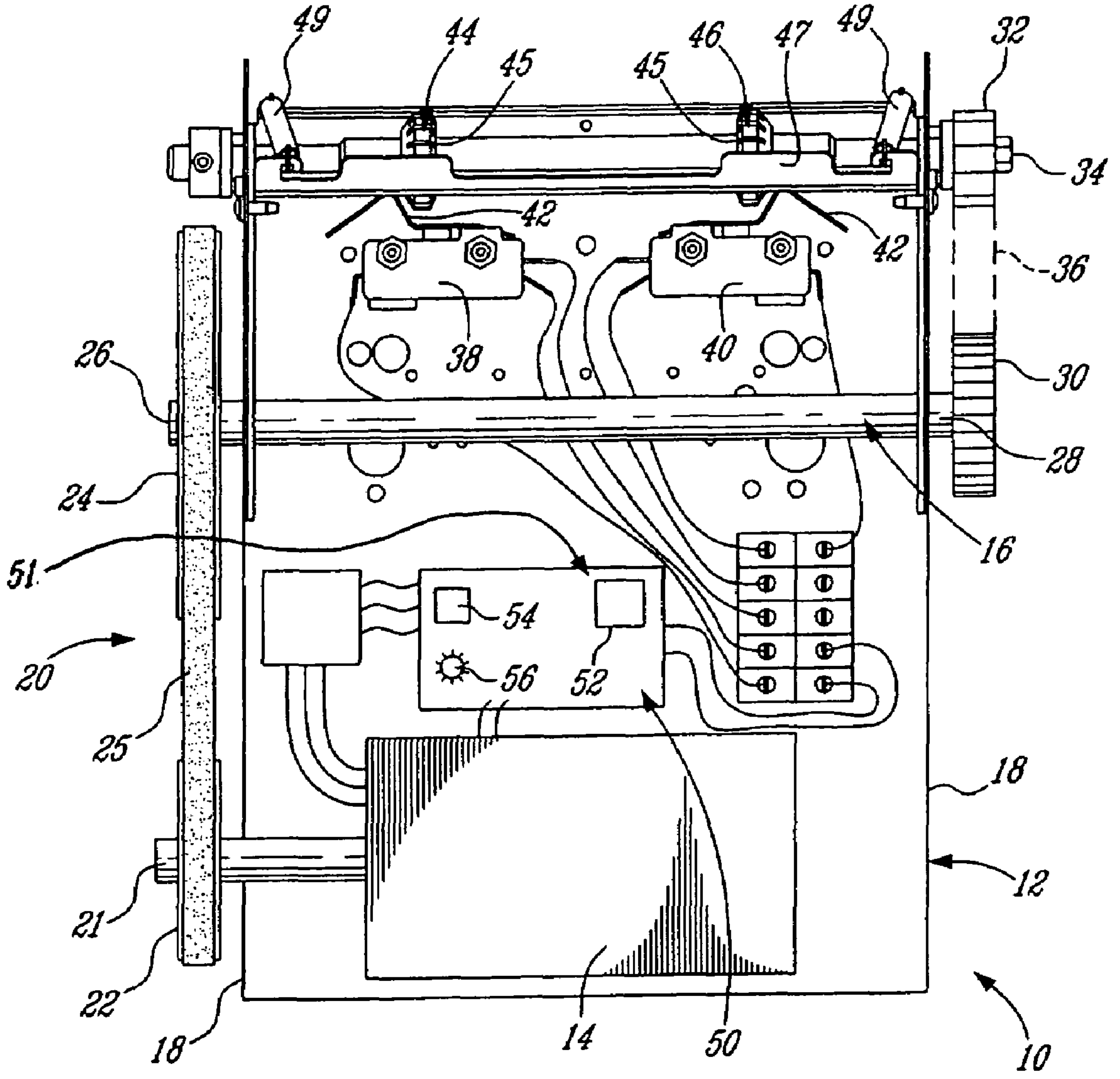
FIG. 3 is a schematic top plan view of the operating device of FIG. 2.

Referring to FIG. 2, the closure operating device 10 for opening and closing an overhead closure, such as the garage door C depicted in FIG. 1 for example, generally comprises a support structure and outer casing 12 defining an internal space therewithin, within which most elements of the closure operating device are contained with the exception of the protruding output shafts and transmission elements of the drive system of the device. Preferably, the operating device 10 is driven by an electric motor 14 mounted within the casing 12. As will be described further below with regard to FIG. 3, the output shaft of the electric motor 14 is operably connected to the operating device output shaft 16, which is journaled within the spaced apart lateral walls 18 of the casing 12, via a transmission 20 (not seen in FIG. 2). The transmission 20, as best seen in FIG. 3, generally includes a driving pulley 22 mounted on the motor output shaft 21 which is interconnected by a belt 25 with a driven pulley 24 mounted on the output shaft 16. By selecting the pulleys 22 and 24 having different diameters, a speed reduction or speed increase is achieved. It is understood that the transmission 20 can alternately include a chain interconnecting driving and driven sprocket gears, in lieu of the pulley and belt system, and further that if desired, no gear up or gear down of the motor output need be provided.

Referring now to FIG. 3 in more detail, the driven pulley 24 of the transmission 20, which may include an integral clutch mechanism disposed therein, is fixed to a first end 26 of the output shaft 16 such that no relative rotation therebetween is possible. This may be achieved by any suitable means such as a keyed interconnection, for example. At an opposed end 28 of the output shaft 16, disposed on an opposite outer side of the casing walls 18, is fixed a sprocket 30. The sprocket 30 may be interconnected with a chain drive system to provide the rotary output from the device, or alternately rotation of the output shaft of the operating device may be used to drive a separate gear, sprocket and/or pulley for interconnection with the closure to translate rotation of the output shaft 16 into displacement of the closure within its lateral guide rails R between the open and closed limit positions of the closure C. The sprocket 30 on the output shaft 16 of the operating device is preferably interconnected, via a flexible transmission element such as a chain or toothed belt, with a second sprocket 32 that is fixed to the control shaft 34 in alignment with the sprocket 30 on the output shaft 28. The co-operating sprockets 30 and 32 are, in the depicted embodiment, interconnected by an endless chain 36. In this embodiment, the output shaft 16 of the operating device 10 is rotatable by the motor 14 in either direction in order to open and close the overhead closure to which it is operably connected, for displacement of the closure between open and closed limit positions.

Figure 4:
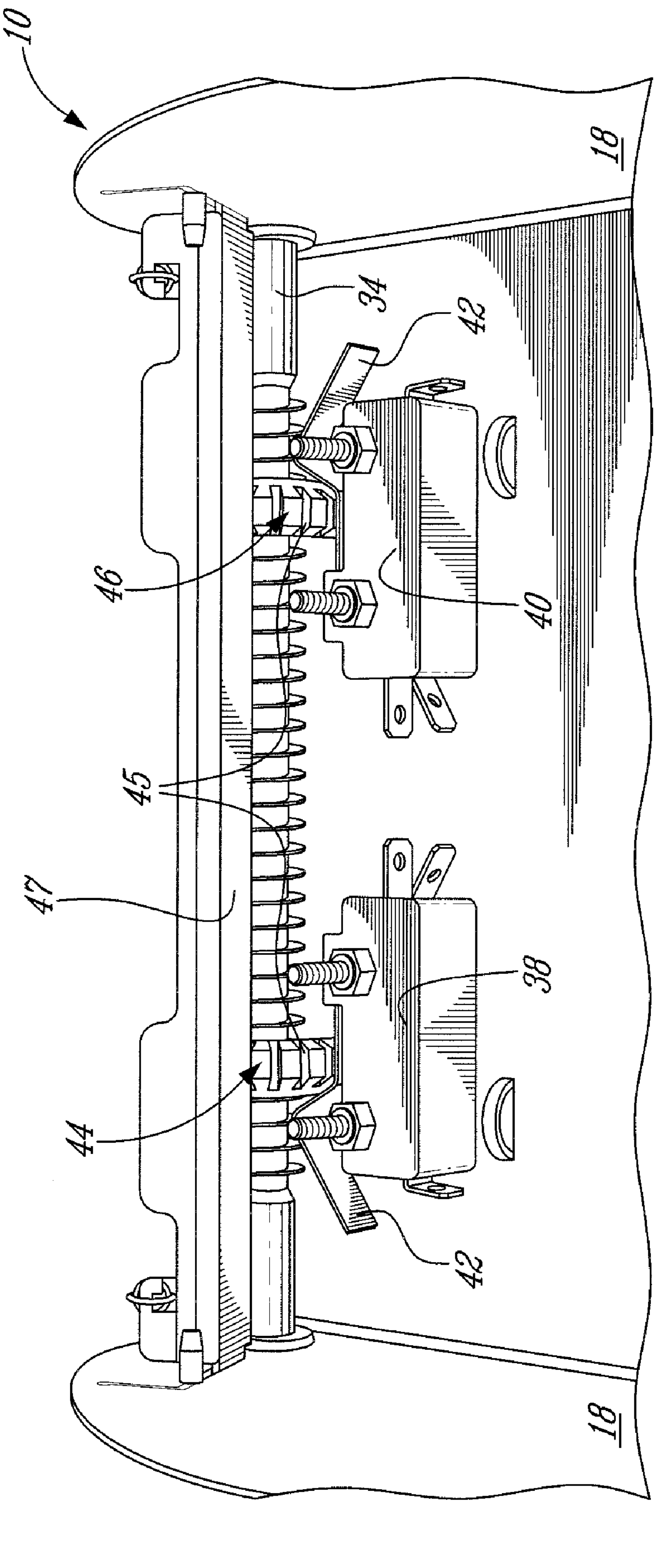
FIG. 4 is a partial top perspective view of the operating device of FIG. 2, showing the limit switches and the switch actuating elements which are displaceable along a rotating shaft of the device.

As best seen in FIG. 4, at least one switch is mounted within the casing 12 of the operating device 10 and disposed in communication with at least the motor 14 in order to stop and start the motor as required in order to control movement of the closure. In the depicted embodiment, two control switches are provided, namely an “open” limit switch 38 and a “close” switch 40. Each of the switches, when actuated, either act to directly cut all power to the electric motor 14 in order to stop movement of the closure at either of the respective end limit positions when used as a end limit point switch or, alternately, act to deactivate the sensing systems when used as an advance close point switch, as will be discussed in further detail below. Each switch includes a contact element 42 which, when displaced by a switch actuator, acts to operate the switch thereby interrupting current to the electric motor. The switch actuators preferably comprise a pair of displaceable cam discs, including an open cam 44 and a close cam 46 which are spaced apart on the control shaft 34. The control shaft 34 is preferably threaded on its outer surface, and the cams are prevented from rotating by a traveling-cam retaining bracket 47, which is received within radially extending slots 45 in each of the open and close cams 44, 46 and retained in contact therewithin by a pair of opposed biasing members, such as helical coil springs 49. As such, the open and close cams 44 and 46 are axially displaceable along the control shaft 34 when the shaft is rotated and remain the same distance apart once their position on the control shaft 34 is set. Therefore, by rotating the control shaft 34, the open and close cams 44 and 46 are forced to axially displace along the length of the control shaft. When either of said cams abut the contacting element 42 of either of the limit switches, power to the electric motor is interrupted, thereby stopping movement of the closure. When the operating device is not running, the traveling-cam retaining bracket 47 may be manually withdrawn from contact with either or both of the cams in order to manually adjust the relative position of each of the cams on the control shaft 34, thus permitting adjustment of the open and closed limit positions of cams on the shaft, and therefore of the overall travel of the closure. Particularly, manually rotating the cam on the stationary control shaft 34 towards the center of the shaft will increase door travel while turning the cam such that it is displaced laterally outwards, towards the corresponding switch, will decrease door travel.

In prior art closure operating devices, three or four limit switches are commonly employed, particularly an open and close limit switch as well as an advance open and an advance close limit switch. The advance close limit switch is used to temporarily deactivate any closure reversing devices or other sensing devices or systems which normally act to stop or reverse direction of the closure in the event of the detection of an obstacle within the closure travel path. Thus, the advance close feature permits such sensing systems to be deactivated slightly before the closure reaches its fully closed position, thereby preventing the closure from reversing when the floor is reached in fully closed position. However, such advance open and close limit switches add further parts to the operating device and provide only very limited adjustment capabilities. Thus, each switch in such prior art devices provides only a given predetermined advance close distance, which typically cannot be readily modified by the end user. The closure operating device 10 of the present invention disposes of at least such a separate advance close switch, as will be described in greater detail below.

Referring back to FIG. 3, the closure operating device 10 of the present invention further includes a sensing system 51 which includes a controller 52, which is disposed at least in communication with a control system 50 (described further below) and which may be integrated directly within the control system 50, which is operable to at least one of stop and reverse travel direction of the closure in response to a signal received from a sensor unit 61 (see FIG. 1) of the sensing system 51. Such a sensor unit 61 may include any suitable sensor such as, for example, a reversing edge 60 (see FIG. 1) disposed along a lower edge of the closure, a loop detector and/or a photocell sensor. The sensor unit 61 can be mounted either directly to the door or to a wall or support surface adjacent the opening that the closure closes off, depending on the type and nature of the selected sensor. The controller 52 of the sensing system 51 therefore receives signals from a sensor unit 61 which is capable of indicating the presence of an obstacle obstructing the travel path of the closure, and is operable to instruct the motor (either directly or via the control system 50) such that the sensing system is able to stop or reverse travel direction of a closure in response to this signal.

The operating device 10 includes a control system 50 which is in communication with both said sensing system and the motor 14, and which is used for controlling all sensing functions of the device. Therefore, the control system 50 is operable to activate the immobilization and reversal of travel direction of the electric motor 14, and therefore of the closure operably connected thereto, in the event of the receipt of a signal from the sensor indicating the presence of an obstacle obstructing the travel path of the closure. The control system 50 includes a control unit, which can include a microprocessor and/or an electromechanical control system.

The control system 50 is preferably an electronic control which includes a circuit board based electronic system having a microprocessor 54 which is programmed to, inter alia, deactivate the above mentioned sensing system at a selected point prior to at least the fully closed limit position of the closure. A sensing operating mode is defined when the sensing system is active, while a free operating mode is defined when the sensing system is deactivated. The electronic control system thus is able to switch between these two modes during travel of the closure. Accordingly, the functions previously carried out in prior art systems by a pair of advance open and close switches are fully digitally controlled by the microprocessor 54 of the electronic control system 50. Preferably, the determination of the selected point prior to the fully closed limit position of the closure can be calculated by the microprocessor 54 based on a given delay characteristic which is determined by the microprocessor or alternately manually selected and/or programmed by the user. This delay characteristic is calculated, for example, based on rotational speed of the electric motor 14, rotational speed of any of the rotating shafts of the device (including the output shaft 28), and a calculated time period which is dependent on the known descent speed of the closure. One or more of these factors may be employed by the control system 50 in order to determine a suitable point, prior to the fully closed position of the closure, at which it remains acceptable to deactivate the sensing features of the entire system. For example, this predetermined point (i.e. the advance close point) may correspond to several inches above the floor or ground on which the closure abuts once it has reached its fully closed limit position.

The advanced close point, or rather the distance and/or travel time of the closure either before or after it, can be determined by the microprocessor of the control system based on various input factors on which it depends, such as rotation speed of the motor and the corresponding decent speed of the closure in addition to total travel distance (or time) thereof. Thus, the control system 50 is able to calculate the corresponding time it takes for the closure, traveling at a known descent speed resulting from the known or measure rotational speed of the motor and the intervening transmission, to travel between a selected sensing system deactivation point and the closure's fully closed position. This time period may be calculated in a number of ways, for example this time period may be calculated by the microprocessor 54 by determining a first time taken by the closure to travel from the fully open limit position to the fully closed or end limit position, and subtracting therefrom a second smaller time interval corresponding to the time required for the closure to go from the fully open position to the selected predetermined deactivation point of the sensing system. Thus, the control system 50, and more particularly the microprocessor 54 thereof, is programmable to calculate and determine either the selected point at which the sensing systems are to be deactivated prior to reaching the fully closed limit position of the closure or the point at which the fully closed position has been reached following an indication that the sensing system deactivation has occurred, and to communicate with the sensing system in order to actuate said deactivation thereof or with the motor to stop operation thereof. The control system 50 may thus directly cut power to the motor, thereby immobilizing the closure, such as once the closure has reached the determined fully closed position thereof. This may be determined based on a calculated time that the closure will take to reach the fully closed position. Thus, for example, the control system 50 can be used to calculate the determined time delay necessary for the closure to reach the selected advance close (sensing system off) point from the initial or fully opened position. Once this point has been reached by the closure, the control system deactivates the sensing systems. Knowing the full travel time required by the closure to reach the end limit position, the control system can then determine the remaining time between the advance close position and the end (fully closed) limit position, and stop all movement of the closure by cutting power to the motor once this remaining time has expired. Other means of calculating the selected advance close position at which time the sensing systems will be deactivated, as well as the complete immobilization of the closure, can be performed using the micro-controller-based electronic control system 50.

In one embodiment, the close switch 40 is used as a sensing system cut-off (or advance close) switch, whereby when the displacing close cam 46 actuates the switch 40, the switch communicates with the control system 50 to deactivate the sensing systems. The control system 50 is then configured to allow the motor to run only for a predetermined time period following this advance close point before power to the motor is cut off and therefore movement of the closure is fully stopped. In this embodiment, therefore, the control system is pre-set to allow an appropriate time period, corresponding to the desired distance between the advance close (i.e. sensing system shut-off) point and the appropriate fully closed limit position of the closure, to elapse before the motor is shut off. As above, the motor can be shut off by the control system either by directly cutting power to the motor or by sending a signal to the motor that power is to be shut off. The appropriate time between the advance close point and the fully closed point will vary depending on the travel speed of the closure, and therefore can either be calculated by the control system or predetermined and set by a user.

In this embodiment, the system operates as follows. As the closure moves along its travel path towards the closed position thereof, whereupon a displacing switch actuating member (in the form of the close cam 46) will eventually actuate the switch 40 at a selected predetermined advance close point, typically only a few inches before the fully closed position of the closure. Once this switch has been actuated, the control system deactivates the sensing systems but allows the motor to continue to run a determined period of time following this advance close switch actuation. Once this determined period of time has elapsed, the motor is shut off and the closure therefore stops in its fully closed position. In one possible embodiment, during the count-down of this determined period of time, the sensing systems are not operational and thus movement of the closure cannot be stopped or reversed in direction thereby. In another alternate embodiment, however, the sensing systems remain operational during this determined period of time. The control system thus nevertheless shuts off the motor after the expiry of this determined time period, however if one of the security measures is activated during this time (in the event of the detection of an obstacle in the travel path), the closure can still stop and/or reverse directions.

Preferably, the control system 50 further includes a manual adjustment element 56, which may be either mounted directly on a circuit board of the control system 50 or alternately may be externally mounted on the operating device 10, such that the user is able to manually adjust and select the point of the closure travel at which the sensing systems are to be deactivated prior to reaching the end limit position. The manual adjustment switch 56, for example mounted on the circuit board of the control system 50 within the casing 12 of the operating device, may include a coded rotating selector switch or a multi switch selector for example, configured such that the user can select one of several different predetermined delay characteristics. Thus, adjustment of the selected point at which the sensing systems are deactivated, and/or the time between this deactivation point and the fully closed position, can be manually varied by the user or technician in situ. Other suitable types of switches can also be used. This can also be achieved by electronically linking an external computer with the control system 50, in order to digitally change any one of a plurality of variable characteristics (such as closure travel speed, rotational motor output speed, time delay for deactivation of the sensing systems, etc.) which are preprogrammed therewithin. The control system may, for example, include a programmable logic circuit (PLC) that can be modified as required, either remotely or directly via the control system mounted within the operating device, in order to change such variable characteristics.

The above description is meant to be exemplary only, and one skilled in the art will recognize that changes may be made to the embodiments described without departing from the scope of the invention disclosed. For example, although the control system is described as employing a programmed/programmable microprocessor to control operation of the sensing system deactivation, the control system 50 may include, alternately or additionally, an electromechanical control system having relays and condensers, by a time-based relay system, or the like. Still other modifications which fall within the scope of the present invention will be apparent to those skilled in the art, in light of a review of this disclosure, and such modifications are intended to fall within the appended claims.

The invention claimed is:

1. A closure operating device for opening and closing an overhead closure, the closure operating device comprising:

a motor operatively connected to an output shaft for rotation thereof, said output shaft being adapted to drive said closure for displacement thereof along a travel path between open and closed limit positions;

a sensing system having a controller operable to at least one of stop and open the closure upon detection of the presence of an obstacle obstructing the travel path of said closure;

a control system in communication with said motor and said controller of said sensing system, said control system including a control unit operable to deactivate said sensing system at a selected point prior to said closed limit position of said closure;

at least one switch in communication with said control system and actuable by a switch actuator, the switch actuator being displaceable along the output shaft and operable to actuate said switch when disposed in a predetermined position therealong; and wherein the control system determines the closed limit position of the closure without switch input and based solely on a calculated delay period following the actuation of said switch, and allows said delay period to expire following actuation of said switch before stopping said motor to immobilize the closure in said determined closed limit position.

2. The operating device as defined in claim 1, wherein the predetermined position of the switch actuator corresponds to said selected point prior to the closed limit position, such that the control system deactivates said sensing system when said switch is actuated by the switch actuator.

3. The operating device as defined in claim 1, wherein the control system maintains said sensing system active during a majority of said delay period between actuation of said switch and the stopping of the motor, said selected point at which said sensing system is deactivated being immediately prior to said closed limit position of said closure.

4. The operating device as defined in claim 1, wherein said predetermined position of said switch actuator corresponds to an advanced close position.

5. The operating device as defined in claim 1, wherein the control system calculates said delay period based on a delay characteristic, said delay characteristic including at least one of rotational speed of said motor, rotational speed of said output shaft and a calculated decent speed of said closure.

6. The operating device as defined in claim 1, wherein said control unit includes a microprocessor programmed to selectively deactivate said sensing system.

7. The operating device as defined in claim 6, wherein said delay period is at least one of determined by said microprocessor and manually selected.

8. The operating device as defined in claim 7, wherein said delay period is calculated by said microprocessor by determining a first time taken by the closure to reach said end limit position and subtracting therefrom a second time corresponding to the time required for said closure to go from said selected point to said end limit position.

9. The operating device as defined in claim 7, wherein said delay period is determined by said microprocessor by calculating a delay between said deactivation of the said sensing system at said selected point and at least said closed limit position of the closure.

10. The operating device as defined in claim 1, wherein said control unit includes an electro-mechanical control system having at least one of relays and condensers, said delay period being defined by a time-based relay system.

11. The operating device as defined in claim 1, wherein said control unit is manually adjustable by a user.

12. The operating device as defined in claim 11, wherein the control unit is manually adjustable using at least one of a selector switch and a predetermined combination of input contacts.

13. The operating device as defined in claim 11, wherein said control unit is manually adjustable between one of a plurality of preset distances between said selected point and said end limit position.

14. The operating device as defined in claim 1, further comprising a casing defining an interior space therewithin, said output shaft being journaled to said casing and having a internal portion extending through said interior space, said internal portion defining an outer screw thread thereon for engaging said switch actuator, said switch actuator being mounted to said internal portion of said output shaft for axial displacement therealong when said output shaft is rotated by said motor.

15. The closure operating device as defined in claim 1, wherein the sensing system includes a sensor unit mountable to one of the closure and a support surface bordering the closure, the sensor unit generating a signal in response to the detected presence of the obstacle obstructing the travel path of said closure.

16. A method of controlling operation of a closure using an electronic control system, the method comprising:

using a sensing system to determine the presence of an obstacle obstructing a travel path of the closure and to at least one of stop and open the closure when the presence of said obstacle is detected;

determining a selected position of the closure below which obstacle detection using the sensing system is not required, and using said electronic control system to calculate a delay characteristic corresponding to said selected position of said closure; and deactivating said sensing system using said control system based solely on said delay characteristic calculated by the control system without any switch signal input.

17. The method as defined in claim 16, wherein a sensing operating mode is defined when said sensing system is active and a free operating mode is defined when said sensing system is deactivated, further comprising using said electronic control system to switch between said sensing operating mode and said free operating mode during travel of said closure.

18. The method as defined in claim 16, further comprising manually adjusting said selected position.

19. The method as defined in claim 18, further comprising selecting one of a plurality of preset values of said selected position.

20. The method as defined in claim 16, wherein the delay characteristic includes at least one of rotational speed of said motor, rotational speed of said output shaft, and a time period dependent on decent speed of said closure.

21. The method as defined in claim 20, wherein the step of calculating said delay characteristic includes calculating said time period based on a travel speed of said closure determined from said rotational speed of said motor.

* * * * *